United States Patent
Chen et al.

(10) Patent No.: US 11,602,861 B1
(45) Date of Patent: Mar. 14, 2023

(54) MODULAR TELESCOPIC ROTATION ARM BY MOTOR CONTROL

(71) Applicant: Cheng Uei Precision Industry Co., LTD., New Taipei (TW)

(72) Inventors: Ming-Tsung Chen, New Taipei (TW); Jun-Wei Huang, New Taipei (TW); Pei-Fen Wu, New Taipei (TW); Jung-Kuang Liu, New Taipei (TW); Kun-Cheng Li, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/828,030

(22) Filed: May 30, 2022

(30) Foreign Application Priority Data

Nov. 17, 2021 (TW) ............................ TW110213591

(51) Int. Cl.
*B25J 18/02* (2006.01)
*B25J 9/10* (2006.01)
*B25J 18/04* (2006.01)

(52) U.S. Cl.
CPC ............. *B25J 18/025* (2013.01); *B25J 9/102* (2013.01); *B25J 18/04* (2013.01)

(58) Field of Classification Search
CPC ........... B25J 18/025; B25J 9/102; B25J 18/04
See application file for complete search history.

(56) References Cited

U.S. PATENT DOCUMENTS

| | | | |
|---|---|---|---|
| 2012/0034022 A1* | 2/2012 | Long | B25J 17/0258 403/81 |
| 2013/0081502 A1* | 4/2013 | Long | B25J 17/0258 74/490.04 |
| 2013/0118288 A1* | 5/2013 | Liu | B25J 9/102 901/26 |
| 2017/0282358 A1* | 10/2017 | Inoue | F16H 1/145 |
| 2018/0229360 A1* | 8/2018 | Adachi | B25J 18/007 |
| 2019/0152053 A1* | 5/2019 | Xiong | B25J 9/102 |
| 2020/0246984 A1* | 8/2020 | Lin | B25J 19/0041 |
| 2021/0245823 A1* | 8/2021 | Bao | B25J 11/002 |
| 2021/0252718 A1* | 8/2021 | Song | B25J 15/0019 |
| 2022/0040869 A1* | 2/2022 | Ikema | B25J 18/04 |
| 2022/0193889 A1* | 6/2022 | Lawson | B25J 9/102 |
| 2022/0252147 A1* | 8/2022 | Song | B25J 9/102 |
| 2022/0363156 A1* | 11/2022 | Zhou | B60L 53/34 |

* cited by examiner

*Primary Examiner* — David M Fenstermacher
(74) *Attorney, Agent, or Firm* — Cheng-Ju Chiang (57) ABSTRACT

A modular telescopic rotation arm by motor control includes a fastening element, a first knuckle module, a first flange, a telescopic module, an outer sleeve module and an inner sleeve module. The first knuckle module is disposed in one end of the fastening element. One end of the first flange is connected to one end of the first knuckle module. The telescopic module is partially disposed in the fastening element. The telescopic module includes a second knuckle module. The second knuckle module is disposed in the fastening element. The outer sleeve module is connected to the first flange, and the telescopic module is partially surrounded by the outer sleeve module. The inner sleeve module is surrounded by the outer sleeve module.

17 Claims, 10 Drawing Sheets

MODULAR TELESCOPIC ROTATION ARM BY MOTOR CONTROL

CROSS-REFERENCE TO RELATED APPLICATION

The present application is based on, and claims priority from, Taiwan Patent Application No. 110213591, filed Nov. 17, 2021, the disclosure of which is hereby incorporated by reference herein in its entirety.

BACKGROUND OF THE INVENTION

1. Field of the Invention

The present invention generally relates to a robot arm, and more particularly to a modular telescopic rotation arm by motor control.

2. The Related Art

With the increasingly rapid development of sciences and technologies, conventional multi-axis robot arms are more and more used in industrial productions. Generally, the conventional multi-axis robot arm includes a plurality of knuckle modules and a plurality of arm modules. Each arm module is connected between two knuckle modules. Each arm module is fixed between the two knuckle modules. However, the arm module which is connected between the two knuckle modules has a constant length structure, so the arm module is unable to change a length, and a usage scope of the conventional multi-axis robot arm is restricted, correspondingly the conventional multi-axis robot arm is just able to be restrictively used in a specific situation.

The conventional multi-axis robot arm includes a pedestal, the plurality of the knuckle modules and at least one telescopic arm module. Two ends of two adjacent knuckle modules which are close to each other have a first connecting structure and a second connecting structure, respectively. The at least one telescopic arm module includes a telescopic tube and a telescopic shaft. One end of the telescopic tube is connected to the first connecting structure. The one end of the telescopic tube is fastened to the first connecting structure. A surface of the other end of the telescopic tube faces the second connecting structure. One end of the telescopic shaft is connected to the second connecting structure. The one end of the telescopic shaft is fastened to the second connecting structure. The other end of the telescopic shaft projects into the telescopic tube. The telescopic shaft is axially telescopic with respect to the telescopic tube. At least two telescopic positions of the telescopic shaft which are opposite to each other is fastened to the telescopic tube through fastening elements.

However, the conventional multi-axis robot arm is only able to manually adjust a lengthening distance and a shortening distance of the at least one telescopic arm module, and the conventional multi-axis robot arm is unable to rotate. A telescopic distance of the conventional multi-axis robot arm has been set at a factory. Only two distances have been set, and the two distances are unable to be changed arbitrarily during a usage process of the conventional multi-axis robot arm. When a length of the at least one telescopic arm module of the conventional multi-axis robot arm is adjusted manually, an unstable accuracy condition is easily caused on account of an inaccurate locking force.

Thus, it is essential to provide a modular telescopic rotation arm by motor control. The modular telescopic rotation arm by motor control is able to adjust a lengthening distance, a shortening distance and a rotation angle during a usage process of the modular telescopic rotation arm by motor control, and according to users' needs, the lengthening distance, the shortening distance and the rotation angle are able to be adjusted in multiple sections. The modular telescopic rotation arm by motor control is able to appropriate for different usage needs for dramatically improving an accuracy and a usage scope of the modular telescopic rotation arm by motor control.

SUMMARY OF THE INVENTION

An object of the present invention is to provide a modular telescopic rotation arm by motor control. The modular telescopic rotation arm by motor control includes a hollow fastening element, a first knuckle module, a first flange, a telescopic module, an outer sleeve module and an inner sleeve module. The first knuckle module is disposed in one end of the fastening element. One end of the first flange is connected to one end of the first knuckle module, and the other end of the first flange is exposed out of the fastening element from the one end of the fastening element. The telescopic module is partially disposed in the fastening element. The telescopic module includes a second knuckle module, a ball screw assembly and a limiting ring. The second knuckle module is disposed in the fastening element. The first knuckle module is disposed between the second knuckle module and the first flange. The ball screw assembly includes a screw shaft and a nut. The limiting ring is disposed around one end of the screw shaft of the ball screw assembly, and the nut is blocked between the first flange and the limiting ring. The outer sleeve module is connected to the first flange, and the telescopic module is partially surrounded by the outer sleeve module. The inner sleeve module is surrounded by the outer sleeve module. The fastening element and the inner sleeve module are disposed opposite to each other. The one end of the screw shaft and the limiting ring are surrounded by the inner sleeve module. The nut is fastened to one end of the inner sleeve module. When the modular telescopic rotation arm by motor control is lengthened or shortened, the nut of the telescopic module drives the inner sleeve module to move along an axial direction of the modular telescopic rotation arm by motor control, the inner sleeve module is stretched out of the outer sleeve module or retracted into the outer sleeve module, a telescopic length of the inner sleeve module is a movement length of the nut moving towards the limiting ring or moving away from the limiting ring. When the first knuckle module rotates, the first knuckle module drives the first flange, the outer sleeve module and the inner sleeve module to rotate.

Another object of the present invention is to provide a modular telescopic rotation arm by motor control. The modular telescopic rotation arm by motor control includes a hollow fastening element, a first knuckle module, a first flange, a second knuckle module, a screw shaft, a nut, an outer sleeve module and an inner sleeve module. The first knuckle module is disposed in the fastening element. A middle of the first knuckle module defines a shaft hole longitudinally penetrating through the first knuckle module. The shaft hole extends along an axial direction of the first knuckle module of the modular telescopic rotation arm by motor control. The first flange is connected to a front end of the first knuckle module. The second knuckle module is disposed in the fastening element. The first knuckle module is disposed between the second knuckle module and the first flange. A rear end of the screw shaft is fastened to the fastening element, and a front end of the screw shaft projects out of the fastening element. The nut is disposed around the front end of the screw shaft. The other end of the screw shaft penetrates though the first flange and the shaft hole, and then the rear end of the screw shaft is connected to the second knuckle module. The outer sleeve module is connected to the first flange, and the outer sleeve module surrounds the screw shaft and the nut. The inner sleeve module is surrounded by the outer sleeve module. The fastening element and the inner sleeve module are disposed opposite to each other. The front end of the screw shaft and the nut are surrounded by the inner sleeve module. The nut is fastened to the inner sleeve module. The inner sleeve module is slidably connected to the screw shaft along the axial direction of the modular telescopic rotation arm by motor control. The inner sleeve module is slidably connected to the outer sleeve module along the axial direction of the modular telescopic rotation arm by motor control. When the first knuckle module rotates, the first knuckle module drives the first flange, the outer sleeve module and the inner sleeve module to rotate with respect to the fastening element. When the second knuckle module drives the screw shaft, the inner sleeve module slides with respect to the outer sleeve module, so that the inner sleeve module is stretched out of the outer sleeve module or retracted into the outer sleeve module.

Another object of the present invention is to provide a modular telescopic rotation arm by motor control. The modular telescopic rotation arm by motor control includes a hollow fastening element, a first knuckle module, a first flange, a second knuckle module, a screw shaft, a nut, an outer sleeve module and an inner sleeve module. Two portions of one side of an inner surface of the hollow fastening element protrude inward to form a front blocking board and a rear blocking board spaced from each other. The front blocking board and the rear blocking board are arranged along an axis direction of the fastening element. A front end of the fastening element defines an opening longitudinally penetrating through a front surface of the fastening element. A distance between the front blocking board and the opening is shorter than a distance between the rear blocking board and the opening. The first knuckle module is disposed between the front blocking board and the opening. A middle of the first knuckle module defines a shaft hole longitudinally penetrating through the first knuckle module. The shaft hole extends along an axial direction of the first knuckle module of the modular telescopic rotation arm by motor control. The first flange is disposed to a front end of the first knuckle module. The second knuckle module is disposed between the rear blocking board and the front blocking board. The first knuckle module is disposed between the second knuckle module and the first flange. A rear end of the screw shaft is fastened to the fastening element, and a front end of the screw shaft projects out of the fastening element. The nut is disposed around the front end of the screw shaft. The rear end of the screw shaft penetrates though the first flange and the shaft hole, and then the rear end of the screw shaft is connected to the second knuckle module. The outer sleeve module is connected to the first flange, and the outer sleeve module surrounds the screw shaft and the nut. The inner sleeve module is surrounded by the outer sleeve module. The fastening element and the inner sleeve module are disposed opposite to each other. The front end of the screw shaft and the nut are surrounded by the inner sleeve module. The nut is fastened to the inner sleeve module. The inner sleeve module is slidably connected to the outer sleeve module along the axial direction of the modular telescopic rotation arm by motor control. The first knuckle module is used for providing power to drive the outer sleeve module, the inner sleeve module and the first flange. The second knuckle module is used for providing the power to drive the inner sleeve module. The first knuckle module adjusts a rotation angle of the outer sleeve module, the inner sleeve module and the first flange. The second knuckle module adjusts a telescopic length of the inner sleeve module. When the first knuckle module rotates, the first knuckle module drives the first flange, the outer sleeve module and the inner sleeve module to rotate. When the second knuckle module drives the inner sleeve module to be stretched out of the outer sleeve module or retracted into the outer sleeve module, the first flange and the outer sleeve module are able to drive the inner sleeve module, and the outer sleeve module guides the inner sleeve module to move along the axial direction of the modular telescopic rotation arm by motor control.

As described above, the modular telescopic rotation arm by motor control is able to adjust a lengthening distance, a shortening distance and a rotation angle during a usage process of the modular telescopic rotation arm by motor control, the first knuckle module adjusts the rotation angle of the outer sleeve module, the inner sleeve module and the first flange, and the second knuckle module of the telescopic module adjusts a telescopic length of the inner sleeve module, respectively. Moreover, according to users' needs, the lengthening distance, the shortening distance and the rotation angle are able to be adjusted in multiple sections. As a result, the modular telescopic rotation arm by motor control is able to appropriate for different usage needs for dramatically improving an accuracy and a usage scope of the modular telescopic rotation arm by motor control.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

With reference to FIG. 1 to FIG. 5, a modular telescopic rotation arm by motor control 100 in accordance with a preferred embodiment of the present invention is shown. The modular telescopic rotation arm by motor control 100 includes a hollow fastening element 1, a telescopic module 2, an outer sleeve module 3, an inner sleeve module 4, a first knuckle module 5 and a first flange 6.

The telescopic module 2 is partially disposed in the fastening element 1. One end of the telescopic module 2 is disposed in the fastening element 1. The outer sleeve module 3 is disposed to one end of the fastening element 1, and the telescopic module 2 is partially surrounded by the outer sleeve module 3. The other end of the telescopic module 2 is surrounded by the outer sleeve module 3. The fastening element 1 and the inner sleeve module 4 are disposed opposite to each other, and the fastening element 1 and the inner sleeve module 4 are separated from each other. The telescopic module 2 is partially surrounded by the inner sleeve module 4. The other end of the telescopic module 2 is surrounded by the inner sleeve module 4. The inner sleeve module 4 is surrounded by the outer sleeve module 3. The first knuckle module 5 is disposed in the one end of the fastening element 1, and the first knuckle module 5 is close to one end of the outer sleeve module 3. One end of the first flange 6 is disposed to one end of the first knuckle module 5. The one end of the first flange 6 is connected to the one end of the first knuckle module 5, and the other end of the first flange 6 is exposed out of the fastening element 1 from the one end of the fastening element 1. The first knuckle module 5 is used for providing power to drive the outer sleeve module 3, the inner sleeve module 4 and the first flange 6 to proceed with a rotation action. A rotation angle of the outer sleeve module 3, the inner sleeve module 4 and the first flange 6 of the modular telescopic rotation arm by motor control 100 is also able to be adjusted during a rotation process. According to users' needs, the rotation angle of the outer sleeve module 3, the inner sleeve module 4 and the first flange 6 of the modular telescopic rotation arm by motor control 100 is able to be adjusted in multiple sections. The one end of the first flange 6 is fastened in the one end of the fastening element 1, and the other end of the first flange 6 is fastened to the outer sleeve module 3. The outer sleeve module 3 is connected to the first flange 6. In the preferred embodiment, the outer sleeve module 3, the inner sleeve module 4 and the first flange 6 are disposed to the same end of the fastening element 1.

Figure 1:
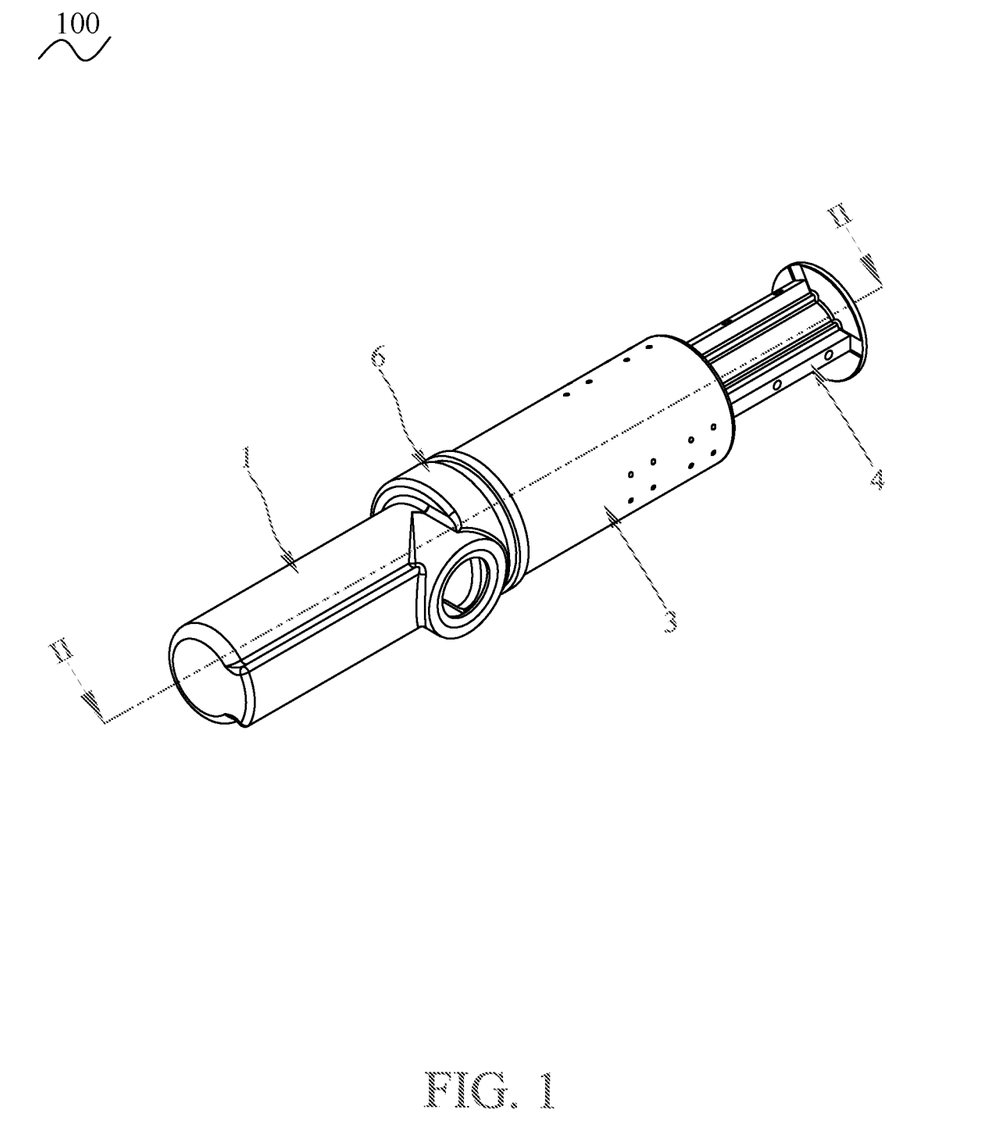
FIG. 1 is a perspective view of a modular telescopic rotation arm by motor control in accordance with a preferred embodiment of the present invention.
Figure 2:
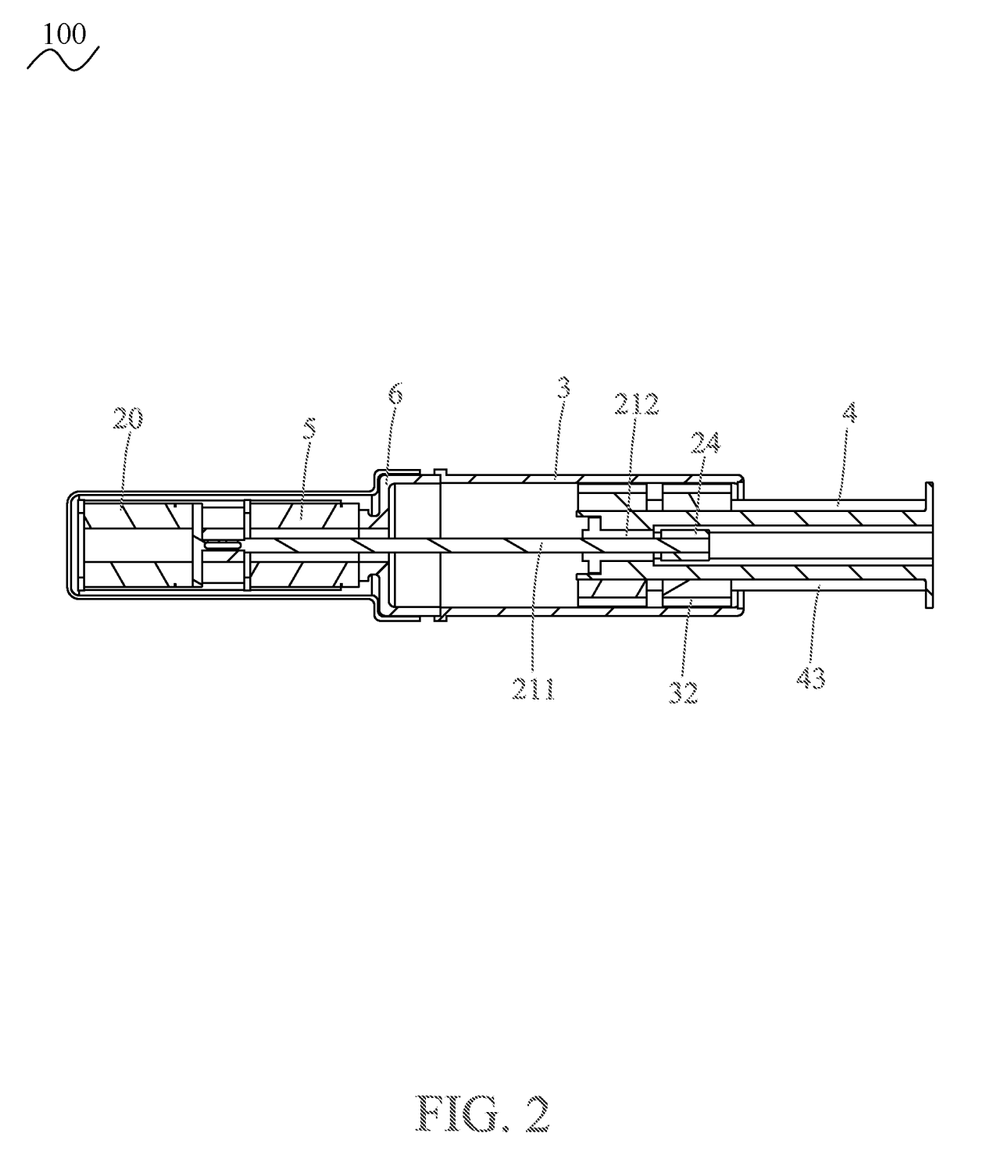
FIG. 2 is a sectional view of the modular telescopic rotation arm by motor control along a line II-II of FIG. 1.
Figure 3:
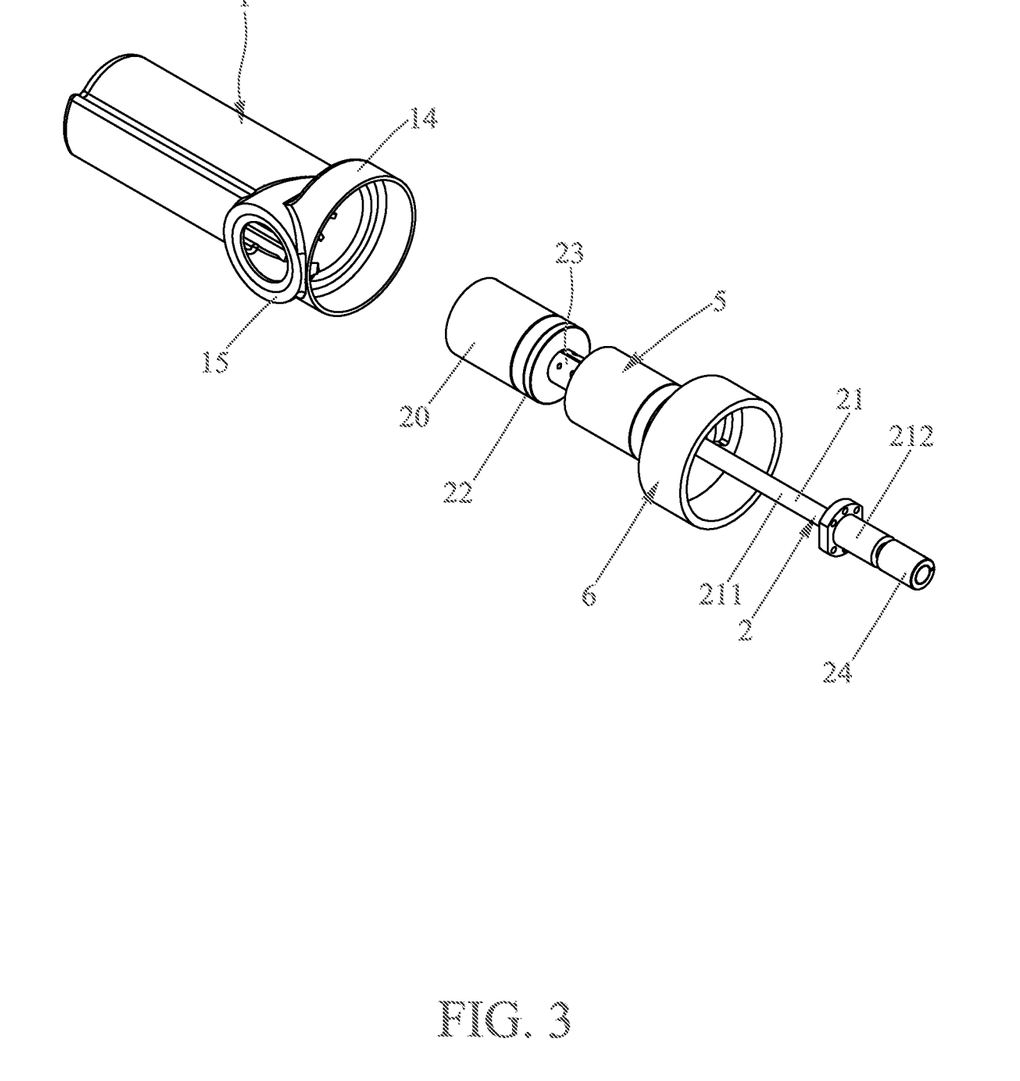
FIG. 3 is partially perspective view of the modular telescopic rotation arm by motor control of FIG. 1.
Figure 4:
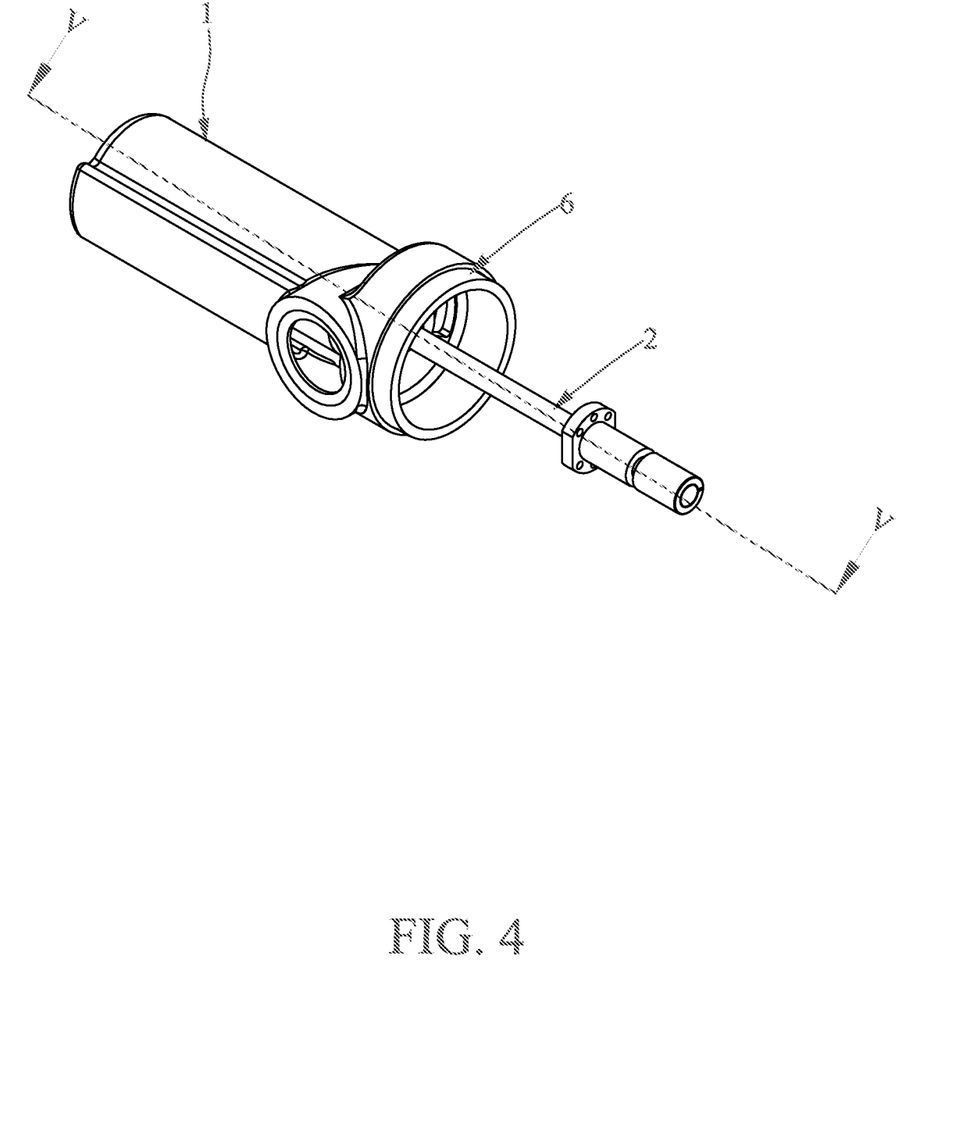
FIG. 4 is a partially exploded view of the modular telescopic rotation arm by motor control of FIG. 1.
Figure 5:
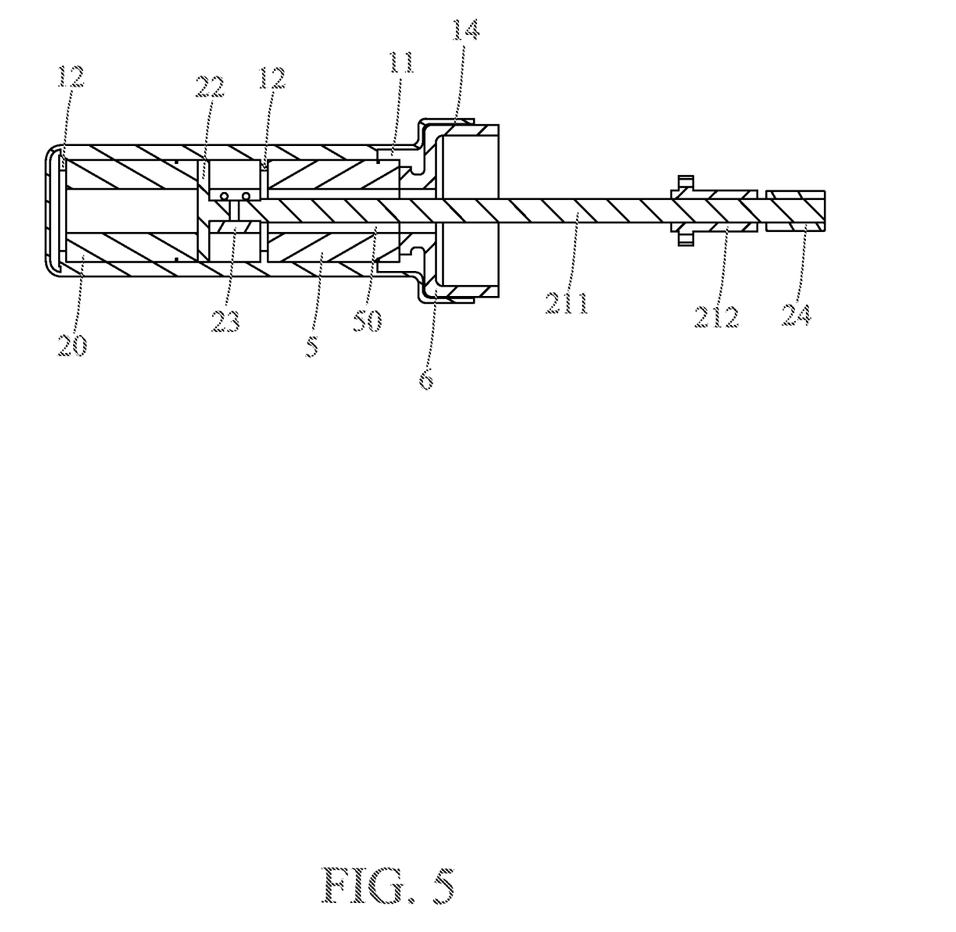
FIG. 5 is a sectional view of the modular telescopic rotation arm by motor control along a line V-V of FIG. 4.
Figure 6:
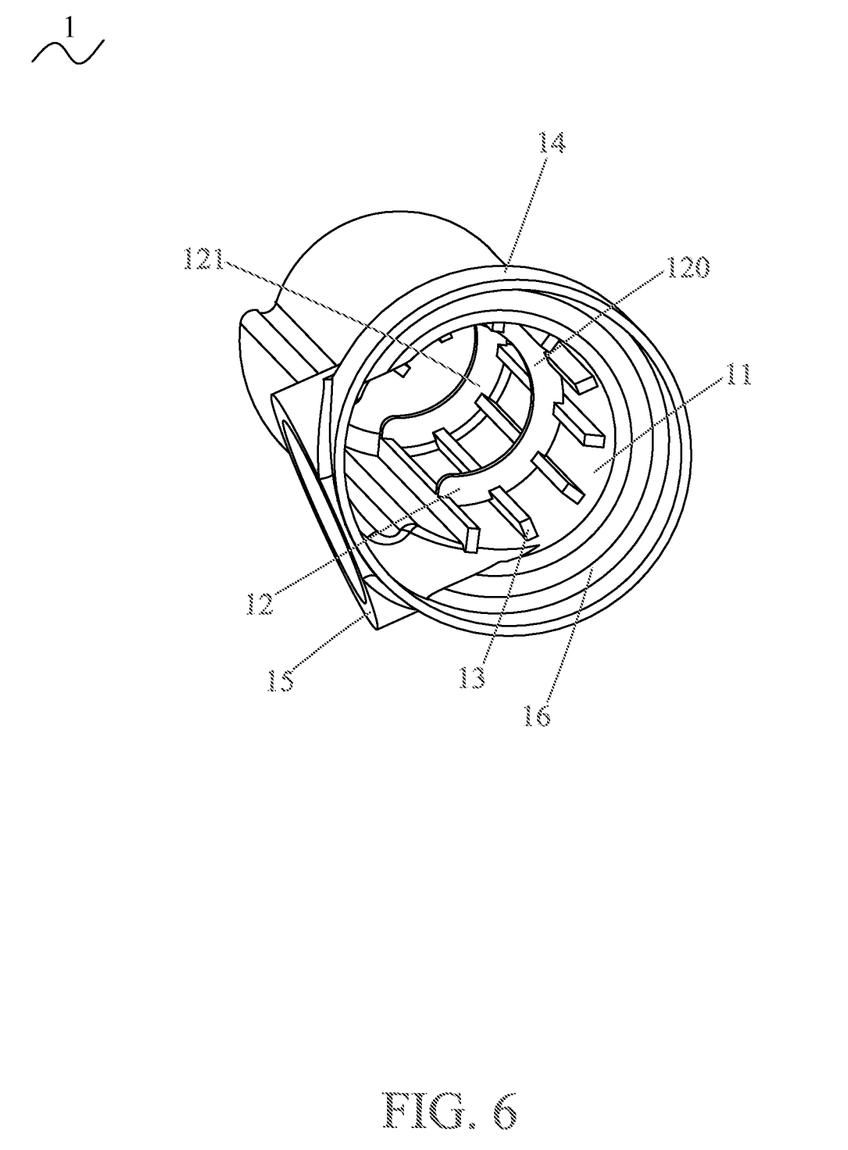
FIG. 6 is a perspective view of a fastening element of the modular telescopic rotation arm by motor control of FIG. 1.

Referring to FIG. 6, the fastening element 1 has an accommodating space 11, two blocking boards 12, a plurality of location ribs 13, a surrounding portion 14, a connecting structure 15 and an opening 16. An inside of the fastening element 1 has the accommodating space 11 extending longitudinally. The one end of the fastening element 1 defines the opening 16 longitudinally penetrating through a front surface of the fastening element 1 which faces the outer sleeve module 3. A front end of the fastening element 1 defines the opening 16. A front end of the accommodating space 11 is communicated with the opening 16. The accommodating space 11 is communicated with an outside of the fastening element 1 through the opening 16. Two portions of one side of an inner surface of the hollow fastening element 1 protrude inward to form the two spaced blocking boards 12. The two blocking boards 12 are arranged along an axis direction of the fastening element 1. The two blocking boards 12 are used for restricting a position of the first knuckle module 5 and a position of a corresponding mechanism of the telescopic module 2. The two blocking boards 12 include a front blocking board 120 and a rear blocking board 121 which are spaced from each other. The two portions of the one side of the inner surface of the hollow fastening element 1 protrude inward to form the front blocking board 120 and the rear blocking board 121 spaced from each other. The front blocking board 120 and the rear blocking board 121 are arranged along the axis direction of the fastening element 1. A distance between the front blocking board 120 and the opening 16 is shorter than a distance between the rear blocking board 121 and the opening 16.

Referring to FIG. 1 to FIG. 6, the first knuckle module 5 is disposed between the front blocking board 120 of the fastening element 1 and the opening 16. The first flange 6 is disposed to a front end of the first knuckle module 5. The first flange 6 is connected to a front end of the first knuckle module 5. A middle of the first knuckle module 5 defines a shaft hole 50 longitudinally penetrating through the first knuckle module 5. The shaft hole 50 extends along an axial direction of the first knuckle module 5 of the modular telescopic rotation arm by motor control 100. Several portions of the one side of the inner surface of the hollow fastening element 1 extend inward and along radial directions of the hollow fastening element 1 to form the plurality of the location ribs 13. The plurality of the location ribs 13 are longitudinally arranged in a front row and a rear row. The front row of the location ribs 13 and the rear row of the location ribs 13 are isolated by the two blocking boards 12. The first knuckle module 5 is fastened among the front row of the location ribs 13 and the front blocking board 120 of the fastening element 1. The plurality of the location ribs 13 are used for fastening the first knuckle module 5 and the corresponding mechanism of the telescopic module 2. A periphery wall of the opening 16 of the fastening element 1 forms the surrounding portion 14. The first flange 6 is partially surrounded by the surrounding portion 14. The one end of the first flange 6 is surrounded by the surrounding portion 14. One side of the fastening element 1 forms the connecting structure 15. The connecting structure 15 is used for being connected to other flanges of the modular telescopic rotation arm by motor control 100 to form a multi-axis robot arm.

Referring to FIG. 3 to FIG. 6, the telescopic module 2 includes a second knuckle module 20, a ball screw assembly 21, a second flange 22, a shaft coupler 23 and a limiting ring 24. The second knuckle module 20, the second flange 22, the shaft coupler 23 and a part of the ball screw assembly 21 are disposed in the accommodating space 11 of the fastening element 1. The second knuckle module 20, the second flange 22, the shaft coupler 23 and a rear end of the ball screw assembly 21 are disposed in the accommodating space 11 of the fastening element 1. The second knuckle module 20 is disposed between the rear blocking board 121 of the fastening element 1 and the front blocking board 120 of the fastening element 1. The second knuckle module 20 is fastened among the rear row of the location ribs 13 of the fastening element 1 and the rear blocking board 121 of the fastening element 1. The first knuckle module 5 is disposed between the second knuckle module 20 of the telescopic module 2 and the first flange 6.

The second knuckle module 20 of the telescopic module 2 is used for providing the power to drive the inner sleeve module 4 to proceed with a stretching action and a retracting action to control a telescopic distance. When the second knuckle module 20 drives the inner sleeve module 4 to be stretched out of the outer sleeve module 3 or retracted into the outer sleeve module 3, the first flange 6 and the outer sleeve module 3 are able to drive the inner sleeve module 4, and the outer sleeve module 3 guides the inner sleeve module 4 to move along the axial direction of the modular telescopic rotation arm by motor control 100. According to the users' needs, the telescopic distance is able to be adjusted in the multiple sections. In a concrete implementation, a disposing position of the first knuckle module 5 and a disposing position of the second knuckle module 20 are exchangeable. The ball screw assembly 21 penetrates though the shaft hole 50 of the first knuckle module 5. The second flange 22 is disposed to one end of the second knuckle module 20. The second flange 22 is fastened to the one end of the second knuckle module 20. The shaft coupler 23 is disposed around the ball screw assembly 21. The shaft coupler 23 is disposed in front of the second flange 22. The shaft coupler 23 is disposed between the second flange 22 and the ball screw assembly 21. One end of the shaft coupler 23 is connected with the ball screw assembly 21, and the other end of the shaft coupler 23 is connected with the second flange 22. The limiting ring 24 is disposed to one end of the ball screw assembly 21. The limiting ring 24 is disposed at a free end of the ball screw assembly 21.

The ball screw assembly 21 includes a screw shaft 211 and a nut 212. The screw shaft 211 is partially fastened in the one end of the fastening element 1. One end of the screw shaft 211 projects out of the fastening element 1. A rear end of the screw shaft 211 is fastened to the fastening element 1, and a front end of the screw shaft 211 projects out of the fastening element 1. The nut 212 is disposed around the front end of the screw shaft 211, the rear end of the screw shaft 211 penetrates though the first flange 6 and the shaft hole 50, and then the rear end of the screw shaft 211 is connected to the second knuckle module 20. The nut 212 is disposed between the shaft coupler 23 and the limiting ring 24. The nut 212 is surrounded by a corresponding portion of the inner sleeve module 4. The nut 212 is fastened to one end of the inner sleeve module 4. The limiting ring 24 is disposed around the one end of the screw shaft 211 of the ball screw assembly 21, and the one end of the screw shaft 211 is close to one end of the nut 212 of the ball screw assembly 21. The limiting ring 24 is disposed around a free end of the screw shaft 211 of the ball screw assembly 21, and the free end of the screw shaft 211 is close to a front end of the nut 212 of the ball screw assembly 21. The nut 212 is blocked behind the limiting ring 24. The nut 212 is blocked between the first flange 6 and the limiting ring 24. The shaft coupler 23 is disposed around the other end of the screw shaft 211 of the ball screw assembly 21, and the other end of the screw shaft 211 is close to the one end of the second knuckle module 20. The other end of the screw shaft 211 penetrates though the first flange 6 and the shaft hole 50, and then the other end of the screw shaft 211 is connected to the second knuckle module 20. The outer sleeve module 3 surrounds the screw shaft 211, the limiting ring 24 and the nut 212. The inner sleeve module 4 is slidably connected to the screw shaft 211 along the axial direction of the modular telescopic rotation arm by motor control 100. The inner sleeve module 4 is slidably connected to the outer sleeve module 3 along the axial direction of the modular telescopic rotation arm by motor control 100.

Referring to FIG. 1 to FIG. 8, the outer sleeve module 3 has a barrel element 31 and a plurality of sliders 32. One end of the barrel element 31 is fastened to the other end of the first flange 6. Two opposite ends of the barrel element 31 are opened freely. Several portions of an inner surface of the barrel element 31 protrude inward and along radial directions of the barrel element 31 to form the plurality of the sliders 32. The plurality of the sliders 32 are evenly distributed around the inner surface of the barrel element 31 along the radial directions of the barrel element 31. The plurality of the sliders 32 are evenly divided into three lines. The plurality of the sliders 32 are divided into the front sliders 32 and the rear sliders 32. In the preferred embodiment, the outer sleeve module 3 has six sliders 32. The outer sleeve module 3 has two spaced sliders 32 longitudinally arranged in each line. The two spaced sliders 32 of each line are arranged along an axis direction of the outer sleeve module 3. The front sliders 32 in the three lines are evenly distributed at the same level along the axis direction of the outer sleeve module 3, and the rear sliders 32 in the three lines are evenly distributed at the same height along the axis direction of the outer sleeve module 3. In the concrete implementation, the outer sleeve module 3 is without being limited to have six sliders 32.

Figure 7:
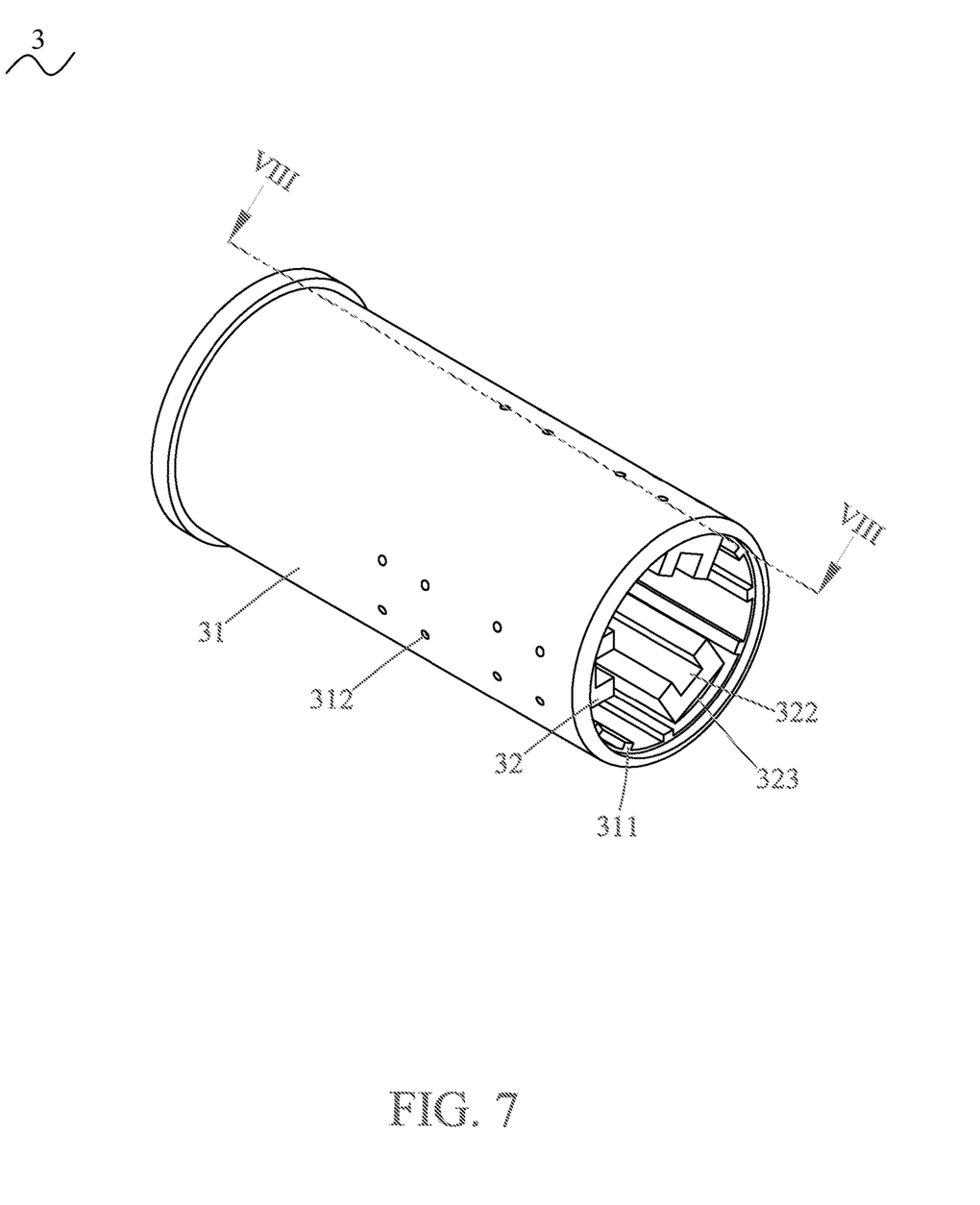
FIG. 7 is a perspective view of an outer sleeve module of the modular telescopic rotation arm by motor control of FIG. 1.
Figure 8:
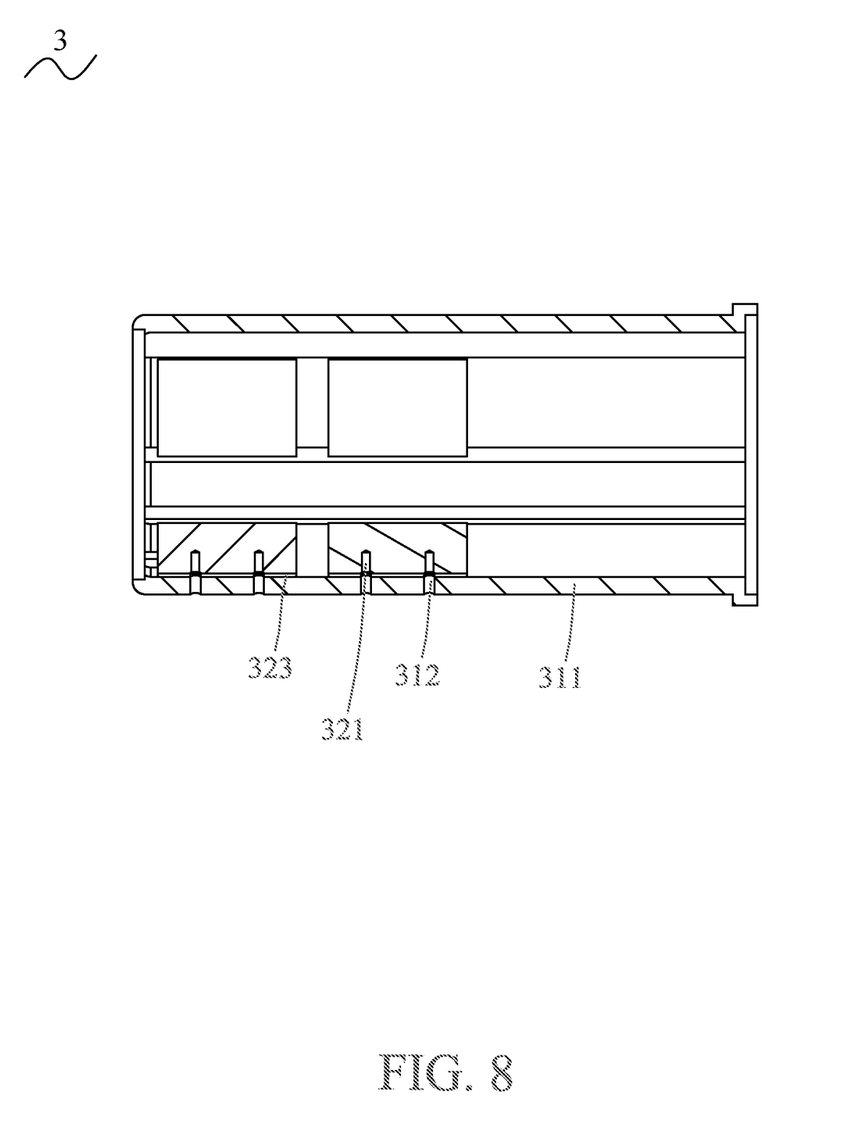
FIG. 8 is a sectional view of the outer sleeve module of the modular telescopic rotation arm by motor control along a line VIII-VIII of FIG. 7.

The barrel element 31 has a plurality of reinforcement ribs 311 and a plurality of first location holes 312. The plurality of the reinforcement ribs 311 are extended inward and along the radial directions of the barrel element 31 from the inner surface of the barrel element 31. The plurality of the reinforcement ribs 311 are evenly distributed around the inner surface of the barrel element 31 along the radial directions of the barrel element 31. The plurality of the reinforcement ribs 311 are used for reinforcing a structural strength of the barrel element 31. The plurality of the reinforcement ribs 311 are evenly divided into three groups. The reinforcement ribs 311 in each group are evenly distributed. The two sliders 32 in each line are located between two groups of the reinforcement ribs 311. The two sliders 32 in each line are disposed between two reinforcement ribs 311 of the two groups of the reinforcement ribs 311. The plurality of the first location holes 312 penetrate through the inner surface and an outer surface of the barrel element 31. The plurality of the first location holes 312 are corresponding to corresponding segments of the plurality of the sliders 32. The modular telescopic rotation arm by motor control 100 includes a plurality of first bolts (not shown). The plurality of the first location holes 312 are locked to the corresponding segments of the plurality of the sliders 32 through the plurality of the first bolts to realize that the plurality of the sliders 32 are located to the barrel element 31, and the plurality of the sliders 32 are fixed to the barrel element 31.

Each slider 32 has a plurality of blind holes 321, an indentation 322 and a pad 323. The pad 323 of each slider 32 is defined as an outer portion of each slider 32. The pad 323 of each slider 32 is disposed between an inner portion of each slider 32 and the inner surface of the barrel element 31. The pads 323 of the plurality of the sliders 32 contact with the inner surface of the barrel element 31. The plurality of the blind holes 321 of the plurality of the sliders 32 penetrate through the pads 323 of the plurality of the sliders 32. The plurality of the blind holes 321 are corresponding to the plurality of the first location holes 312 of the barrel element 31. The modular telescopic rotation arm by motor control 100 includes a plurality of second bolts (not shown). The plurality of the second bolts penetrate through the plurality of the first location holes 312 of the barrel element 31 and the pads 323 of the plurality of the sliders 32, and then the plurality of the second bolts are fastened in the plurality of the blind holes 321 of the plurality of the sliders 32, so the plurality of the sliders 32 are fastened in the inner surface of the barrel element 31. A middle of an inner surface of each slider 32 is recessed opposite to a center of the barrel element 31 to form the indentation 322. The indentation 322 extends along an axis direction of the barrel element 31. The indentation 322 of each slider 32 is used for receiving a corresponding structure of the inner sleeve module 4, so the inner sleeve module 4 is able to be stretched out of the outer sleeve module 3 or retracted into the outer sleeve module 3.

Referring to FIG. 1 to FIG. 10, the inner sleeve module 4 includes a telescopic shaft 41, a third flange 42 and a plurality of slide rails 43. The third flange 42 is used for being connected to the other flanges of the modular telescopic rotation arm by motor control 100 to form the multi-axis robot arm. The third flange 42 is disposed to one end of the telescopic shaft 41. The other end of the telescopic shaft 41 surrounds the nut 212 of the telescopic module 2. One sides of the plurality of the slide rails 43 are disposed in corresponding constructions of the telescopic shaft 41. The other sides of the plurality of the slide rails 43 are disposed in the indentations 322 of the plurality of the sliders 32 of the outer sleeve module 3, so the inner sleeve module 4 is able to be stretched out of the outer sleeve module 3 or retracted into the outer sleeve module 3 to lengthen the modular telescopic rotation arm by motor control 100 or shorten the modular telescopic rotation arm by motor control 100.

Figure 9:
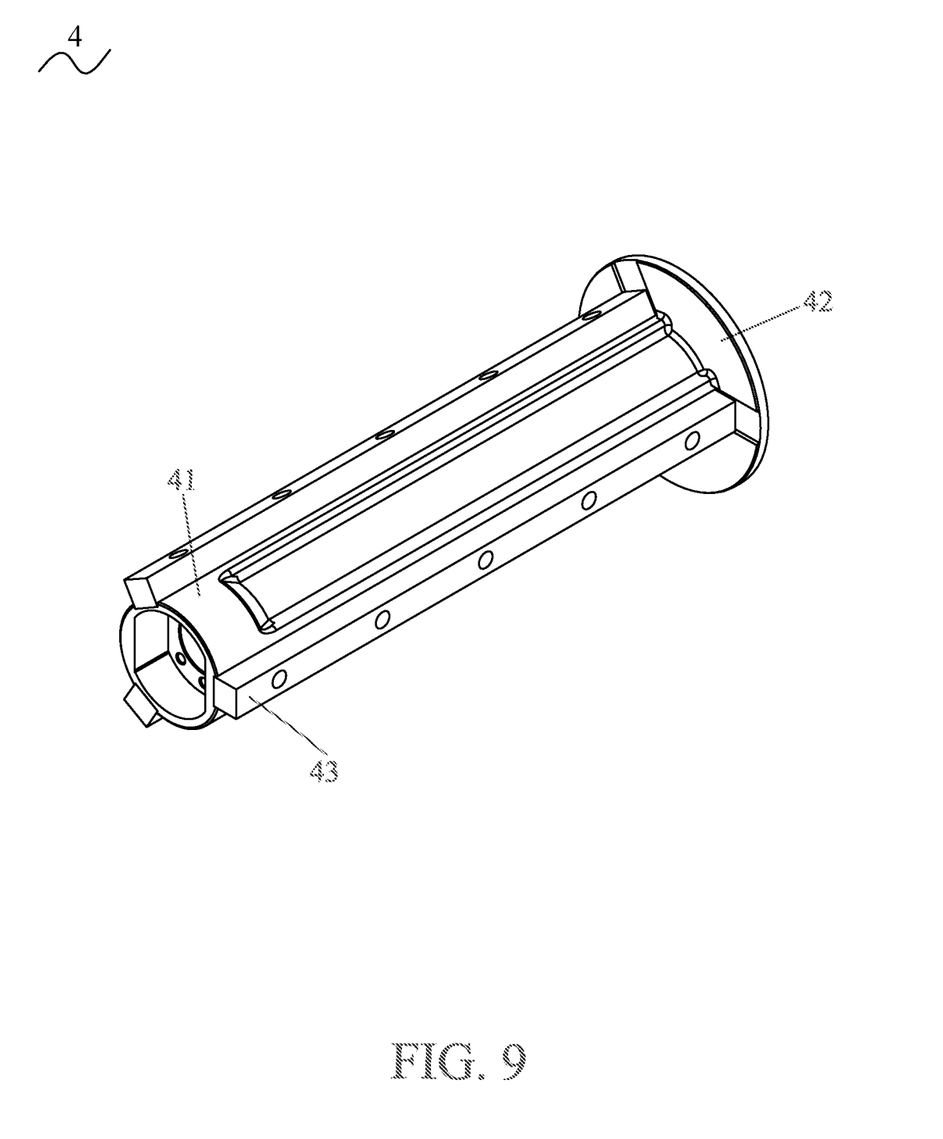
FIG. 9 is a perspective view of an inner sleeve module of the modular telescopic rotation arm by motor control of FIG. 1.
Figure 10:
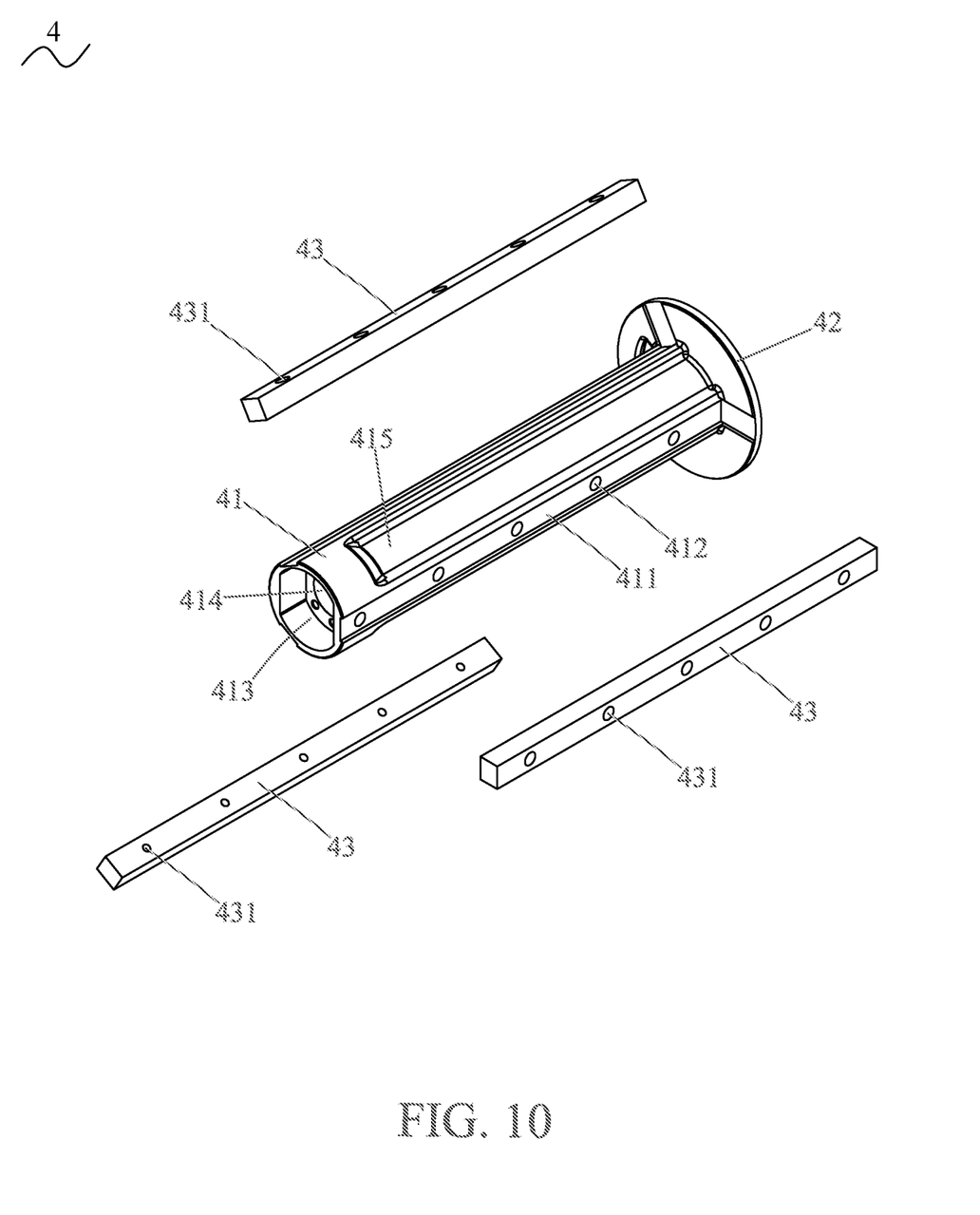
FIG. 10 is an exploded view of the inner sleeve module of the modular telescopic rotation arm by motor control of FIG. 1.

The telescopic shaft 41 has a plurality of assembling grooves 411, a plurality of assembling holes 412, a fastening groove 413, a perforation 414 and a plurality of lacking grooves 415. The plurality of the assembling grooves 411 are recessed inward and along radial directions of the telescopic shaft 41 from an outer surface of the telescopic shaft 41. The plurality of the assembling grooves 411 are evenly distributed around the outer surface of the telescopic shaft 41 along the radial directions of the telescopic shaft 41. Each assembling groove 411 extends longitudinally. The plurality of the assembling grooves 411 are corresponding to the plurality of the slide rails 43. The one sides of the plurality of the slide rails 43 are disposed in the plurality of the assembling grooves 411 of the telescopic shaft 41, and the other sides of the plurality of the slide rails 43 are disposed in the indentations 322 of the plurality of the sliders 32 of the outer sleeve module 3. The inner sleeve module 4 is able to be stretched out of the outer sleeve module 3 or retracted into the outer sleeve module 3 by virtue of the plurality of the slide rails 43 being slidably disposed in the indentations 322 of the plurality of the sliders 32 of the outer sleeve module 3.

The plurality of the assembling holes 412 penetrate through inner walls of the plurality of the assembling grooves 411 of the telescopic shaft 41 along the radial directions of the telescopic shaft 41. The plurality of the slide rails 43 have a plurality of second location holes 431. The plurality of the second location holes 431 penetrate through the plurality of the slide rails 43 along the radial directions of the telescopic shaft 41. The plurality of the assembling holes 412 of the telescopic shaft 41 are corresponding to the plurality of the second location holes 431 of the plurality of the slide rails 43. The modular telescopic rotation arm by motor control 100 includes a plurality of third bolts (not shown). The plurality of the third bolts are fastened to the plurality of the assembling holes 412 of the telescopic shaft 41 and the plurality of the second location holes 431 of the plurality of the slide rails 43 to realize that the plurality of the slide rails 43 are located to the telescopic shaft 41, and the plurality of the slide rails 43 are fixed to the telescopic shaft 41.

In the preferred embodiment, the inner sleeve module 4 has three assembling grooves 411 and three slide rails 43. A middle of an inner surface of the other end of the telescopic shaft 41 is recessed inward to form the fastening groove 413. The perforation 414 penetrates through two middles of the two opposite ends of the telescopic shaft 41 along an axial direction of the telescopic shaft 41 of the modular telescopic rotation arm by motor control 100. The perforation 414 penetrates through two middles of a front end and a rear end of the telescopic shaft 41 along the axial direction of the telescopic shaft 41 of the modular telescopic rotation arm by motor control 100. The nut 212 of the telescopic module 2 is fastened in the fastening groove 413 and the perforation 414. The one end of the screw shaft 211 and the limiting ring 24 of the telescopic module 2 are surrounded by the inner sleeve module 4. The one end of the screw shaft 211 and the limiting ring 24 of the telescopic module 2 are disposed in the perforation 414 of the inner sleeve module 4. The front end of the screw shaft 211 and the nut 212 are surrounded by the inner sleeve module 4. Several portions of the outer surface of the telescopic shaft 41 are recessed inward to form the plurality of the lacking grooves 415. Each lacking groove 415 is disposed between two assembling grooves 411. The plurality of the lacking grooves 415 are used for reducing a weight of the inner sleeve module 4 and increasing a tracing space of the modular telescopic rotation arm by motor control 100.

The first knuckle module 5 and the second knuckle module 20 has a motor. When the modular telescopic rotation arm by motor control 100 is lengthened or shortened, the nut 212 of the telescopic module 2 drives the inner sleeve module 4 to move along the axial direction of the modular telescopic rotation arm by motor control 100, the inner sleeve module 4 is stretched out of the outer sleeve module 3 or retracted into the outer sleeve module 3, a telescopic length of the inner sleeve module 4 is a moving length of the nut 212 towards the limiting ring 24 or away from the limiting ring 24 along the axial direction of the modular telescopic rotation arm by motor control 100.

In the preferred embodiment, the first knuckle module 5 drives the first flange 6, and the first flange 6 is connected with the outer sleeve module 3. The plurality of the slide rails 43 of the inner sleeve module 4 are slidably connected to the indentations 322 of the plurality of the sliders 32 of the outer sleeve module 3. When the first knuckle module 5 rotates, the first knuckle module 5 drives the first flange 6, the outer sleeve module 3 and the inner sleeve module 4 to rotate with respect to the fastening element 1. When the second knuckle module 20 rotates, the inner sleeve module 4 slides with respect to the outer sleeve module 3, so that the inner sleeve module 4 is stretched out of the outer sleeve module 3 or retracted into the outer sleeve module 3. When the second knuckle module 20 drives the screw shaft 211 of the ball screw assembly 21, the inner sleeve module 4 slides with respect to the outer sleeve module 3, so that the inner sleeve module 4 is stretched out of the outer sleeve module 3 or retracted into the outer sleeve module 3.

In the preferred embodiment, the first knuckle module 5 and the second knuckle module 20 are able to provide the power at the same time. In other words, the modular telescopic rotation arm by motor control 100 is without being limited to rotate after the stretching action or the retracting action of the inner sleeve module 4 of the modular telescopic rotation arm by motor control 100, so the modular telescopic rotation arm by motor control 100 is able to proceed with the rotation action at the time of proceeding with the stretching action or the retracting action of the modular telescopic rotation arm by motor control 100, specifically, the inner sleeve module 4 is able to be stretched out of the outer sleeve module 3 or retracted into the outer sleeve module 3 at the time of rotating the first knuckle module 5 together with the first flange 6, the outer sleeve module 3 and the inner sleeve module 4 of the modular telescopic rotation arm by motor control 100.

In the preferred embodiment, the modular telescopic rotation arm by motor control 100 is made of an aluminum alloy material, and in the concrete implementation, the modular telescopic rotation arm by motor control 100 is without being limited to be made of the aluminum alloy material.

As described above, the modular telescopic rotation arm by motor control 100 is able to adjust a lengthening distance, a shortening distance and the rotation angle during a usage process of the modular telescopic rotation arm by motor control 100, the first knuckle module 5 adjusts the rotation angle of the outer sleeve module 3, the inner sleeve module 4 and the first flange 6, and the second knuckle module 20 of the telescopic module 2 adjusts the telescopic length of the inner sleeve module 4, respectively. Moreover, according to the users' needs, the lengthening distance, the shortening distance and the rotation angle are able to be adjusted in the multiple sections. As a result, the modular telescopic rotation arm by motor control 100 is able to appropriate for different usage needs for dramatically improving an accuracy and a usage scope of the modular telescopic rotation arm by motor control 100.

What is claimed is:

1. A modular telescopic rotation arm by motor control, comprising:
   a hollow fastening element;
   a first knuckle module disposed in one end of the fastening element;
   a first flange, one end of the first flange being connected to one end of the first knuckle module, and the other end of the first flange being exposed out of the fastening element from the one end of the fastening element;
   a telescopic module partially disposed in the fastening element, the telescopic module including a second knuckle module, a ball screw assembly and a limiting ring, the second knuckle module being disposed in the fastening element, the first knuckle module being disposed between the second knuckle module and the first flange, the ball screw assembly including a screw shaft and a nut, the limiting ring being disposed around one end of the screw shaft of the ball screw assembly, and the nut being blocked between the first flange and the limiting ring;
   an outer sleeve module connected to the first flange, and the telescopic module being partially surrounded by the outer sleeve module; and
   an inner sleeve module surrounded by the outer sleeve module, the fastening element and the inner sleeve module being disposed opposite to each other, the one end of the screw shaft and the limiting ring being surrounded by the inner sleeve module, the nut being fastened to one end of the inner sleeve module;
   wherein when the modular telescopic rotation arm by motor control is lengthened or shortened, the nut of the telescopic module drives the inner sleeve module to move along an axial direction of the modular telescopic rotation arm by motor control, the inner sleeve module is stretched out of the outer sleeve module or retracted into the outer sleeve module, a telescopic length of the inner sleeve module is a movement length of the nut moving towards the limiting ring or moving away from the limiting ring; and
   wherein when the first knuckle module rotates, the first knuckle module drives the first flange, the outer sleeve module and the inner sleeve module to rotate.

2. The modular telescopic rotation arm by motor control as claimed in claim 1, wherein an inside of the fastening element has an accommodating space extending longitudinally, the one end of the fastening element defines an opening longitudinally penetrating through a front surface of the fastening element which faces the outer sleeve module, a front end of the accommodating space is communicated with the opening, the accommodating space is communicated with an outside of the fastening element through the opening, two portions of one side of an inner surface of the hollow fastening element protrude inward to form two spaced blocking boards, the two blocking boards are arranged along an axis direction of the fastening element, several portions of the one side of the inner surface of the hollow fastening element extend inward and along radial directions of the hollow fastening element to form a plurality of location ribs, the plurality of the location ribs are longitudinally arranged in a front row and a rear row, the front row of the location ribs and the rear row of the location ribs are isolated by the two blocking boards, a periphery wall of the opening of the fastening element forms a surrounding portion, the first flange is partially surrounded by the surrounding portion, one side of the fastening element forms a connecting structure.

3. The modular telescopic rotation arm by motor control as claimed in claim 2, wherein the two blocking boards include a front blocking board and a rear blocking board which are spaced from each other, a distance between the front blocking board and the opening is shorter than a distance between the rear blocking board and the opening, the first knuckle module is disposed between the front blocking board and the opening, the first knuckle module is fastened among the front row of the location ribs and the front blocking board, the second knuckle module is disposed between the rear blocking board and the front blocking board, the second knuckle module is fastened among the rear row of the location ribs and the rear blocking board of the fastening element.

4. The modular telescopic rotation arm by motor control as claimed in claim 3, wherein the telescopic module includes a second flange and a shaft coupler, the second knuckle module, the second flange, the shaft coupler and a part of the ball screw assembly are disposed in the accommodating space of the fastening element, the second flange is fastened to one end of the second knuckle module, the shaft coupler is disposed around the other end of the screw shaft of the ball screw assembly, and the other end of the screw shaft is close to one end of the second knuckle module, the shaft coupler is disposed between the second flange and the ball screw assembly, one end of the shaft coupler is connected with the ball screw assembly, and the other end of the shaft coupler is connected with the second flange, the limiting ring is disposed to one end of the ball screw assembly, the nut is disposed between the shaft coupler and the limiting ring, the limiting ring is disposed around a free end of the screw shaft of the ball screw assembly, and the free end of the screw shaft is close to a front end of the nut of the ball screw assembly.

5. The modular telescopic rotation arm by motor control as claimed in claim 1, wherein the outer sleeve module has a barrel element and a plurality of sliders, one end of the barrel element is fastened to the other end of the first flange, two opposite ends of the barrel element are opened, several portions of an inner surface of the barrel element protrude inward and along radial directions of the barrel element to form the plurality of the sliders, the plurality of the sliders are evenly distributed around the inner surface of the barrel element along the radial directions of the barrel element, the plurality of the sliders are evenly divided into three lines, the outer sleeve module has two spaced sliders longitudinally arranged in each line.

6. The modular telescopic rotation arm by motor control as claimed in claim 5, wherein the barrel element has a plurality of reinforcement ribs and a plurality of first location holes, the plurality of the reinforcement ribs are extended inward and along the radial directions of the barrel element from the inner surface of the barrel element, the plurality of the reinforcement ribs are evenly distributed around the inner surface of the barrel element along the radial directions of the barrel element, the plurality of the reinforcement ribs are evenly divided into three groups, the reinforcement ribs in each group are evenly distributed, the two sliders in each line are located between two groups of the reinforcement ribs, the two sliders in each line are disposed between two reinforcement ribs of the two groups of the reinforcement ribs, the plurality of the first location holes penetrate through the inner surface and an outer surface of the barrel element.

7. The modular telescopic rotation arm by motor control as claimed in claim 6, wherein each slider has a plurality of blind holes, an indentation and a pad, the pad of each slider is defined as an outer portion of each slider, the pad of each slider is disposed between an inner portion of each slider and the inner surface of the barrel element, the pads of the plurality of the sliders contact with the inner surface of the barrel element, the plurality of the blind holes of the plurality of the sliders penetrate through the pads of the plurality of the sliders, the plurality of the blind holes are corresponding to the plurality of the first location holes, a middle of an inner surface of each slider is recessed opposite to a center of the barrel element to form the indentation.

8. The modular telescopic rotation arm by motor control as claimed in claim 7, wherein the inner sleeve module includes a telescopic shaft, a third flange and a plurality of slide rails, the third flange is disposed to one end of the telescopic shaft, the other end of the telescopic shaft surrounds the nut of the telescopic module, one sides of the plurality of the slide rails are disposed in the telescopic shaft, the other sides of the plurality of the slide rails are disposed in the indentations of the plurality of the sliders.

9. The modular telescopic rotation arm by motor control as claimed in claim 8, wherein the telescopic shaft has a plurality of assembling grooves, the plurality of the assembling grooves are recessed inward and along radial directions of the telescopic shaft from an outer surface of the telescopic shaft, the plurality of the assembling grooves are evenly distributed around the outer surface of the telescopic shaft along the radial directions of the telescopic shaft, each assembling groove extends longitudinally, the plurality of the assembling grooves are corresponding to the plurality of the slide rails, the one sides of the plurality of the slide rails are disposed in the plurality of the assembling grooves of the telescopic shaft, and the other sides of the plurality of the slide rails are disposed in the indentations of the plurality of the sliders.

10. The modular telescopic rotation arm by motor control as claimed in claim 9, wherein the telescopic shaft has a plurality of assembling holes, the plurality of the assembling holes penetrate through inner walls of the plurality of the assembling grooves of the telescopic shaft along the radial directions of the telescopic shaft, the plurality of the slide rails have a plurality of second location holes, the plurality of the second location holes penetrate through the plurality of the slide rails along the radial directions of the telescopic shaft, the plurality of the assembling holes of the telescopic shaft are corresponding to the plurality of the second location holes of the plurality of the slide rails.

11. The modular telescopic rotation arm by motor control as claimed in claim 10, wherein a middle of an inner surface of the other end of the telescopic shaft is recessed inward to form a fastening groove, the telescopic shaft has a perforation, the perforation penetrates through two middles of a front end and a rear end of the telescopic shaft along an axial direction of the telescopic shaft, the nut of the telescopic module is fastened in the fastening groove and the perforation, the one end of the screw shaft and the limiting ring of the telescopic module are disposed in the perforation of the inner sleeve module, several portions of the outer surface of the telescopic shaft are recessed inward to form a plurality of lacking grooves, each lacking groove is disposed between two assembling grooves.

12. The modular telescopic rotation arm by motor control as claimed in claim 1, wherein a middle of the first knuckle module defines a shaft hole longitudinally penetrating through the first knuckle module, the shaft hole extends along an axial direction of the first knuckle module of the modular telescopic rotation arm by motor control, the ball screw assembly penetrates though the shaft hole of the first knuckle module.

13. The modular telescopic rotation arm by motor control as claimed in claim 1, wherein a disposing position of the first knuckle module and a disposing position of the second knuckle module are exchangeable.

14. The modular telescopic rotation arm by motor control as claimed in claim 1, wherein the modular telescopic rotation arm by motor control is made of an aluminum alloy material.

15. A modular telescopic rotation arm by motor control, comprising:
a hollow fastening element;
a first knuckle module disposed in the fastening element, a middle of the first knuckle module defining a shaft hole longitudinally penetrating through the first knuckle module, the shaft hole extending along an axial direction of the first knuckle module of the modular telescopic rotation arm by motor control;
a first flange connected to a front end of the first knuckle module;
a second knuckle module disposed in the fastening element, the first knuckle module being disposed between the second knuckle module and the first flange;
a screw shaft, a rear end of the screw shaft being fastened to the fastening element, and a front end of the screw shaft projecting out of the fastening element;
a nut disposed around the front end of the screw shaft, the rear end of the screw shaft penetrating though the first flange and the shaft hole, and then the rear end of the screw shaft being connected to the second knuckle module;
an outer sleeve module connected to the first flange, and the outer sleeve module surrounding the screw shaft and the nut; and
an inner sleeve module surrounded by the outer sleeve module, the fastening element and the inner sleeve module being disposed opposite to each other, the front end of the screw shaft and the nut being surrounded by the inner sleeve module, the nut being fastened to the inner sleeve module, the inner sleeve module being slidably connected to the screw shaft along the axial direction of the modular telescopic rotation arm by motor control, the inner sleeve module being slidably connected to the outer sleeve module along the axial direction of the modular telescopic rotation arm by motor control;

wherein when the first knuckle module rotates, the first knuckle module drives the first flange, the outer sleeve module and the inner sleeve module to rotate with respect to the fastening element; and wherein when the second knuckle module drives the screw shaft, the inner sleeve module slides with respect to the outer sleeve module, so that the inner sleeve module is stretched out of the outer sleeve module or retracted into the outer sleeve module.

16. The modular telescopic rotation arm by motor control as claimed in claim 15, wherein a disposing position of the first knuckle module and a disposing position of the second knuckle module are exchangeable.

17. A modular telescopic rotation arm by motor control, comprising:

a hollow fastening element, two portions of one side of an inner surface of the hollow fastening element protruding inward to form a front blocking board and a rear blocking board spaced from each other, the front blocking board and the rear blocking board being arranged along an axis direction of the fastening element, a front end of the fastening element defining an opening longitudinally penetrating through a front surface of the fastening element, a distance between the front blocking board and the opening being shorter than a distance between the rear blocking board and the opening;

a first knuckle module being disposed between the front blocking board and the opening, a middle of the first knuckle module defining a shaft hole longitudinally penetrating through the first knuckle module, the shaft hole extending along an axial direction of the first knuckle module of the modular telescopic rotation arm by motor control;

a first flange disposed to a front end of the first knuckle module;

a second knuckle module disposed between the rear blocking board and the front blocking board, the first knuckle module being disposed between the second knuckle module and the first flange;

a screw shaft, a rear end of the screw shaft being fastened to the fastening element, and a front end of the screw shaft projecting out of the fastening element;

a nut disposed around the front end of the screw shaft, the rear end of the screw shaft penetrating though the first flange and the shaft hole, and then the rear end of the screw shaft being connected to the second knuckle module;

an outer sleeve module connected to the first flange, and the outer sleeve module surrounding the screw shaft and the nut; and an inner sleeve module surrounded by the outer sleeve module, the fastening element and the inner sleeve module being disposed opposite to each other, the front end of the screw shaft and the nut being surrounded by the inner sleeve module, the nut being fastened to the inner sleeve module, the inner sleeve module being slidably connected to the outer sleeve module along the axial direction of the modular telescopic rotation arm by motor control, the first knuckle module being used for providing power to drive the outer sleeve module, the inner sleeve module and the first flange, the second knuckle module being used for providing the power to drive the inner sleeve module, the first knuckle module adjusting a rotation angle of the outer sleeve module, the inner sleeve module and the first flange, the second knuckle module adjusting a telescopic length of the inner sleeve module;

wherein when the first knuckle module rotates, the first knuckle module drives the first flange, the outer sleeve module and the inner sleeve module to rotate; and wherein when the second knuckle module drives the inner sleeve module to be stretched out of the outer sleeve module or retracted into the outer sleeve module, the first flange and the outer sleeve module are able to drive the inner sleeve module, and the outer sleeve module guides the inner sleeve module to move along the axial direction of the modular telescopic rotation arm by motor control.

* * * * *